June 20, 1933.   H. A. JOHNSON ET AL   1,914,510
CONTROL MECHANISM FOR VEHICLES
Filed Aug. 18, 1930    2 Sheets-Sheet 1
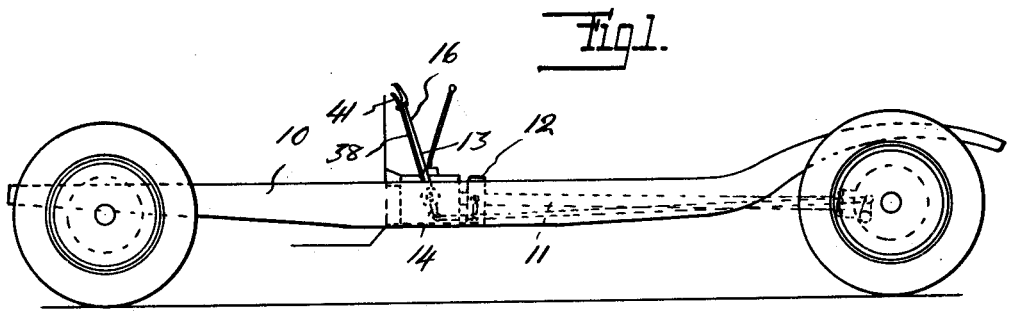
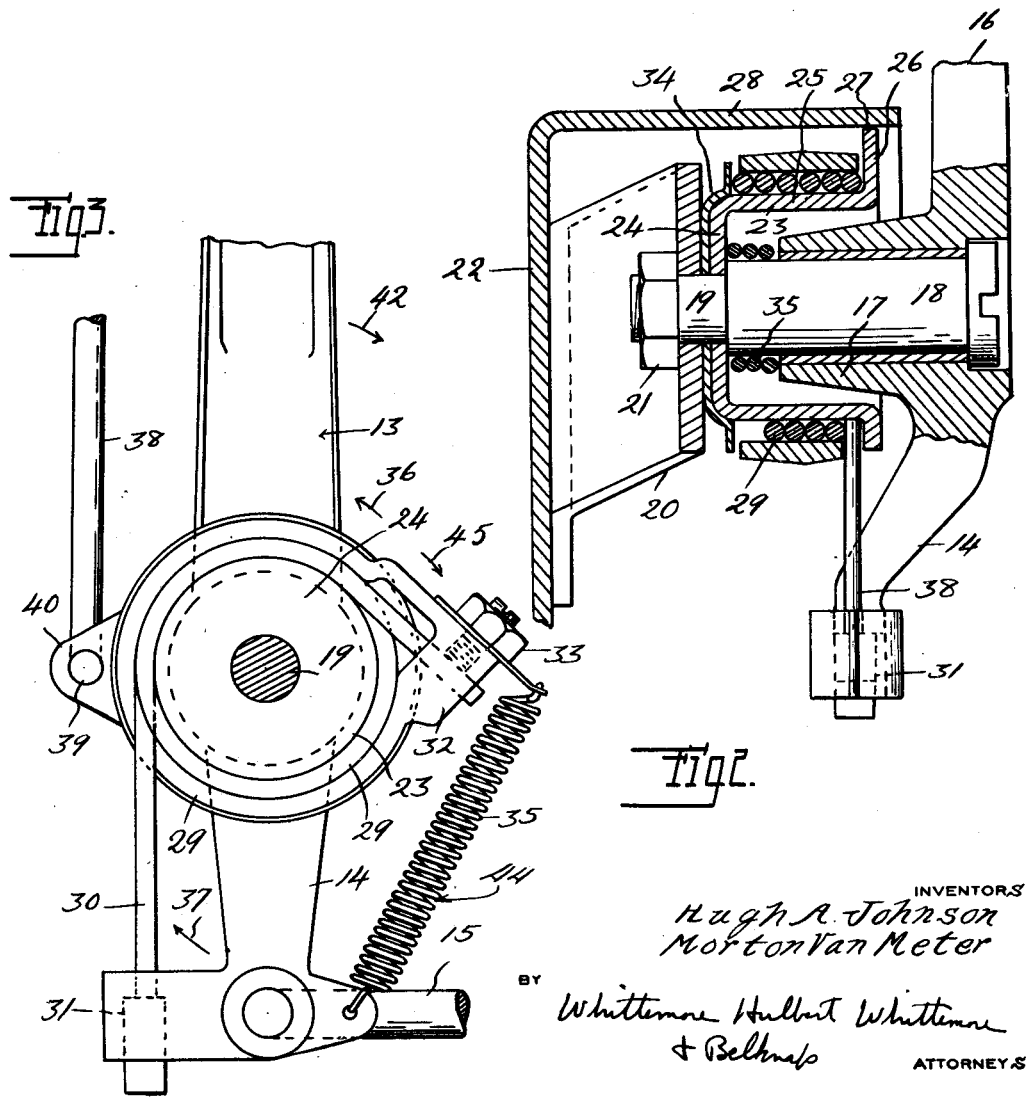
INVENTORS
Hugh A. Johnson
Morton Van Meter
BY Whittemore Hulbert Whittemore
& Belknap
ATTORNEYS June 20, 1933.  H. A. JOHNSON ET AL  1,914,510
CONTROL MECHANISM FOR VEHICLES
Filed Aug. 18, 1930  2 Sheets-Sheet 2
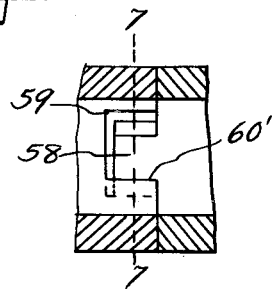
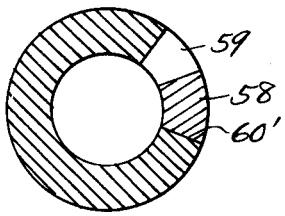
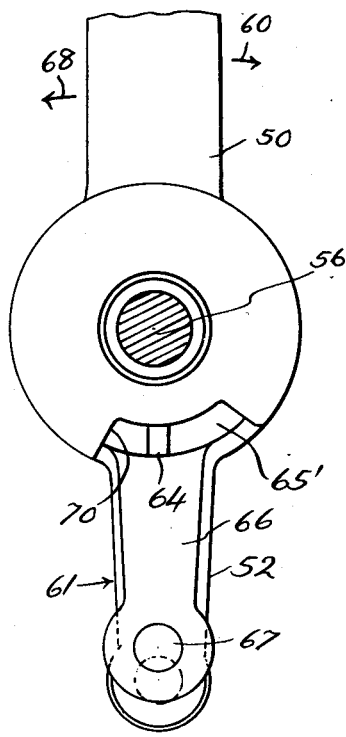
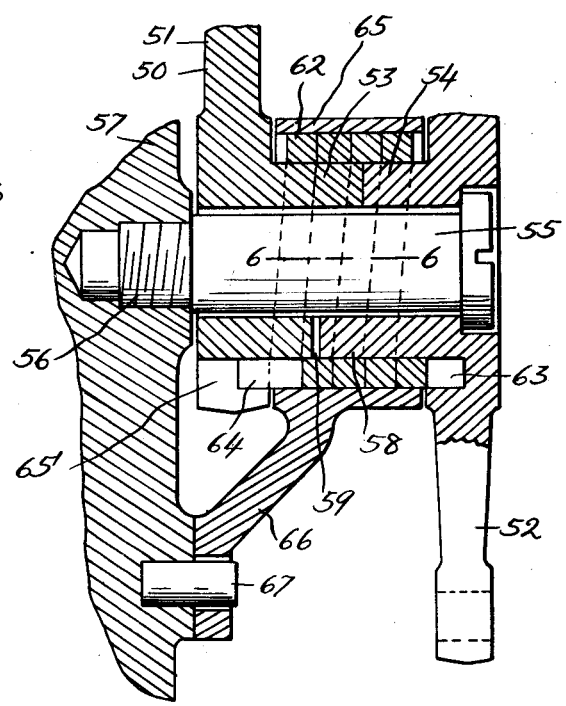
INVENTORS
Hugh A. Johnson
Morton Van Meter
BY Whittemore Hulbert Whittemore
& Belknap  ATTORNEYS Patented June 20, 1933

1,914,510

UNITED STATES PATENT OFFICE

HUGH A. JOHNSON, OF LANSING, AND MORTON VAN METER, OF DETROIT, MICHIGAN, ASSIGNORS TO HUPP MOTOR CAR CORPORATION, OF DETROIT, MICHIGAN, A CORPORATION OF VIRGINIA

CONTROL MECHANISM FOR VEHICLES

Application filed August 18, 1930. Serial No. 476,154.

This invention relates to control mechanism for motor vehicles and more particularly to improved means for actuating vehicle brakes.

While the invention is capable of many and diversified uses, it finds particular utility when used in connection with the conventional parking or emergency brake control lever for holding the latter in various positions of adjustment.

One of the principal objects of this invention is to eliminate the usual ratchet and pawl devices employed upon a great many vehicles as now commercially produced for holding the hand brake levers in predetermined positions by providing means for frictionally holding the control levers distinguished by the comparative ease with which the latter may be operated.

With the foregoing as well as other objects in view, the invention resides in the novel details of construction which will be made more apparent as this description proceeds, especially when considered in connection with the accompanying drawings, wherein:

Figure 1 is a fragmentary side elevational view of a vehicle chassis equipped with emergency brake operating unit constructed in accordance with this invention.

Figure 2 is a sectional view illustrating the means for holding the brake actuating element in various positions of adjustment.

Figure 3 is a side elevational view of the construction shown in Figure 2.

Figure 4 is a view similar to Figure 2 showing a slightly modified form of construction.

Figure 5 is a side elevational view of the construction shown in Figure 4.

Figure 6 is a sectional view taken on the line 6—6 of Figure 4.

Figure 7 is a sectional view taken on the line 7—7 of Figure 6.

Referring now to the drawings, it will be noted that there is illustrated fragmentarily and diagrammatically in Figure 1 a vehicle chassis 10 having a propeller shaft 11 supported thereon in the conventional manner for transmitting power to the rear wheels (not shown) of the chassis. Associated with the propeller shaft is a suitable brake 12 of the mechanical type operable to hold the propeller shaft from rotation and thereby brake the rear wheels of the vehicle.

For actuating the brake 12, we provide a manually operable control lever 13 having the lower end 14 operatively connected to the brake 12 by means of the link 15 and having the upper portion 16 extending into the driver's compartment of the vehicle in a position to be conveniently grasped by the operator. As shown particularly in Figure 2, the control lever 13 is provided with a sleeve-like portion 17 intermediate the portions 14 and 16 and sleeved upon a pin 18 for rockably supporting the lever. The pin 18 is in the form of a bolt having a reduced threaded shank portion 19 secured to a bracket 20 by means of the nut 21. The bracket 20 is preferably bolted or otherwise suitably secured to the base portion of the channel-shaped member 22 forming a sill of the chassis frame 10.

In order to hold the control lever 16 in a position wherein the brake 12 is either fully or partially applied, we provide a clutch comprising a drum 23 having the web portion 24 thereof engaging the inner surface of the bracket 20 and mounted upon the reduced portion 19 of the shaft 18. The annular flange 25 of the drum extends inwardly from the bracket 20 and is curled upwardly to form a radial reinforcing flange 26. The upper edge of the flange 26 is preferably provided with a substantially flat surface 27 adapted to engage the upper leg 28 of the channel-shaped sill member 22 for preventing rotation of the drum relative to the shaft 18. Wrapped around the flange 25 is a flexible cable 29 having one end 30 secured to the lower portion 14 of the control lever adjacent the connection thereof to the brake as at 31 and having the other end secured to a ring 32 as at 33. The ring 32 is rotatably mounted relative to the drum 23 and as shown in Figure 2 surrounds the cable 29 to normally maintain the convolutions of the cable in operative position relative to the flange 25. The convolutions of the cable 29 are prevented from axial movement relative to the drum in one direction by means of the reinforcing flange 26 on the drum and in the opposite direction by means of a suitable stop 34 clamped between the bracket and the web of the brake flange by means of the nut 21 on the outer end of the shaft 18. Surrounding the bolt 18 intermediate the web of the drum and hub portion of the control lever is a spring 35 for yieldably holding the control lever into engagement with the head of the bolt 18 as clearly shown in Figure 2 of the drawings.

The cable 29 is normally held in frictional engagement with the flange 25 by means of a coil spring 35' having one end secured to the lower portion 14 of the lever and the opposite end secured to the ring 32 tending to rotate the latter in a direction to wind the cable 29 around the flange 25. Thus, it will be apparent that before the hand brake lever 16 can be operated to apply the brake, it is essential to release the frictional resistance between the cable and flange 25. The foregoing is accomplished by anchoring the opposite ends of the cable 29 to the lower portion 14 of the lever and ring 32, respectively, so that movement of the lever 16 to apply the brake 12 causes the lower portion 14 of the lever to rotate in the direction of the arrow 37 in Figure 3 causing the cable to slip about the flange 25 under action of the spring 35'. After the brake has been applied and movement of the lever discontinued, the cable is again tightened about the flange 25 by the spring 35'. In this connection it is to be noted when the parts are in the latter position, the reaction of the brake mechanism tends to rotate the lower portion 14 of the lever in the direction of the arrow 36. A force upon the lower portion of the lever in the direction of the arrow 36 tends to tighten the cable about the flange 25 and thereby assists the spring 35' in holding the control lever 13 in its adjusted position.

In order to release the frictional resistance between the convolutions of the cable 29 and flange 25, it is necessary to move the ring 32 in the direction of the arrow 36. For accomplishing the above result, we provide a pull rod 38 having the lower end thereof secured as at 39 to an ear 40 projecting laterally from the ring 32. The upper end of the rod 38 is preferably connected to the lower end of the spoon 41 which, as shown, is pivotally connected as at 42 to the upper end of the control lever in the conventional manner. The arrangement is such that movement of the upper end of the spoon 41 in the direction of the arrow 42 causes the ring 32 to move in the directon of the arrow 36 against the action of the spring 35' to release the pressure of the cable 29 upon the drum flange 25 and thereby permit actuation of the control lever 13 to release the brake 12. In this connection it is to be noted that the spring 35' may be relatively light since a force of comparatively small magnitude exerted upon the end of the cable 29 causes the convolutions of the cable to grip the drum flange with a force of appreciably greater magnitude than that exerted by said spring.

In the modification illustrated in Figures 4 and 5, we have shown a control lever 50 formed of two parts 51 and 52 having sleeve-like portions 53 and 54, respectively, rotatably mounted in axial alignment upon a shaft 55 which in turn is secured as at 56 to a support 57. The upper portion 51 of the control lever 50 preferably extends within the driver's compartment to be conveniently manipulated by the operator while the lower portion 52 is operatively connected to the vehicle brake or brakes.

In order to establish an operative connection between the parts 51 and 52 of the control lever 50, the sleeve-like portion 54 is provided with an axially extending lug 58 adapted to extend within an elongated slot 59 formed in the adjacent end of the sleeve-like portion 53, as shown in Figure 6, permitting relative rotation of the parts 51 and 52. The arrangement is such that rotation of the part 51 in the direction of the arrow 60 causes the lug 58 to engage one wall 60' of the slot to rock the part 52 in the direction of the arrow 61 to apply the brake.

In order to hold the control lever 50 in any desired position of adjustment, we provide a clutch comprising a coil spring 62 surrounding the sleeve-like portions 53 and 54 in concentric relation to the shaft 55 and having one end secured to the part 52 of the control lever 50 as at 63. The opposite end of the coil spring is offset as at 64 and is arranged to extend within an elongated slot 65' formed in the lower end of the part 51 permitting relative rotation of the latter part and end of spring 64. The peripheral surfaces of the convolutions of the coil spring are preferably substantially flat, as will be apparent from Figure 4, so as to have an extended area of contact with the interior surface of the drum 65. The drum 65 is spaced a sufficient distance from the sleeve-like portions 53 and 54 to receive the coil spring 62 and is non-rotatably supported relative to the sleeve-like portions by means of a bracket 66 formed integral with the brake drum and secured to the support 57 as at 67. The dimension of the spring 62 is so selected that when assembled within the space between the brake drum and sleeve-like portions, the ends thereof are compressed against the inner surface of the drum. The arrangement is such as to normally frictionally lock the part 52 from rotation.

Assuming that the brake control lever 50 is in its inoperative position and it is desired to apply the brake, the operator merely exerts a slight force upon the part 51 to rotate the same in the direction of the arrow 60 in Figure 5. Rotation of the part 51, as specified above, effects a corresponding rotation of the part 52 through the inter-locking connection, hereinbefore set forth, to apply the brake. It will further be observed that initial rotation of the part 52 to apply the brake causes a rotation of the end 63 of the coil spring in a direction to contract the latter and relieve the frictional resistance between the convolutions of the spring and drum to permit the above-mentioned rotation of the part 52. In this connection it is to be noted that during rotation of the part 51, as specified above, the end 64 of the spring is not disturbed since the slot 65' is of sufficient dimension to permit the necessary rotation of part 52 to apply the brake without engaging the spring. When the operator has moved the control lever to the desired position and releases the same, the spring 62 immediately assumes its initial position wherein the convolutions thereof frictionally engage the drum and prevent further movement of the control lever irrespective of the position of the brake. In explanation of the latter operation, it will be noted that when the brake is set and the control lever released, the reaction of the brake mechanism and spring 62 move the part 52 relative to the part 51 toward released position a sufficient distance to set the convolutions aforesaid of the spring in frictional engagement with the drum.

When it is desired to release the brake, the operator merely exerts a slight force upon the part 51 of the lever 50 in a direction opposite to the direction hereinbefore set forth, as illustrated by the arrow 68 in Figure 5. Movement of the control lever 50 in the direction of the arrow 68 causes the wall 70 of the slot 65' to engage the end 64 of the coil spring and rotate the same in a corresponding direction. Rotation of the end 64 of the spring in the above direction causes the convolutions thereof to move out of frictional contact with the drum and thereby permits the part 52 to be moved in a direction to release the brake.

What we claim as our invention is:

1. In a vehicle control mechanism, the combination with a brake and a control lever having a portion intermediate the ends thereof pivotally connected to a support and having the lower end thereof operatively connected to the brake, of a drum carried by the mounting aforesaid for the lever and fixed against rotation, an annular ring surrounding the drum in spaced relation thereto and mounted for rotation relative to the drum, a coiled flexible member having the convolutions thereof wrapped around the drum and positioned within the space between the latter and ring, said coiled flexible member having the free end portions respectively connected to the lower portions of the lever and ring, and means connected to said ring normally tending to rotate the same in a direction to cause the convolutions of the flexible member to grip the drum and thereby hold the lever against movement.

2. In a vehicle control mechanism, the combination with a brake and a control lever movable in one direction to apply the brake, of means for holding said lever in positions wherein the brake is applied including a drum fixed against rotation, a member surrounding the drum in spaced relation thereto and mounted for rotation relative to the drum, a coiled flexible member having the convolutions thereof arranged within the space between the drum and member aforesaid and arranged to frictionally engage the drum, said flexible member having the free end portions thereof connected to the rotatable member aforesaid and lever, means tending to rotate said rotatable member in a direction to tighten the convolutions of said coiled flexible member about said drum, and means operable from said lever for rotating the rotatable member in the opposite direction to release the coils from engagement with the drum and permit actuation of said lever.

In testimony whereof we affix our signatures.

MORTON VAN METER.
HUGH A. JOHNSON.